United States Patent
DiCicco

(10) Patent No.: US 12,553,480 B2
(45) Date of Patent: Feb. 17, 2026

(54) MAGNETIC BRAKING AND SPEED CONTROL SYSTEM FOR WALKER

(71) Applicant: David DiCicco, Fort Lauderdale, FL (US)

(72) Inventor: David DiCicco, Fort Lauderdale, FL (US)

(*) Notice: Subject to any disclaimer, the term of this patent is extended or adjusted under 35 U.S.C. 154(b) by 329 days.

(21) Appl. No.: 18/210,263

(22) Filed: Jun. 15, 2023

(65) Prior Publication Data

US 2024/0003393 A1    Jan. 4, 2024

Related U.S. Application Data

(60) Provisional application No. 63/357,748, filed on Jul. 1, 2022.

(51) Int. Cl.
| | |
|---|---|
| *F16D 63/00* | (2006.01) |
| *A61H 3/04* | (2006.01) |
| *B60B 33/00* | (2006.01) |
| *F16D 59/00* | (2006.01) |
| *F16D 65/22* | (2006.01) |
| *F16D 121/20* | (2012.01) |

(52) U.S. Cl.
CPC ............ *F16D 63/002* (2013.01); *A61H 3/04* (2013.01); *B60B 33/0094* (2013.01); *F16D 59/00* (2013.01); *F16D 65/22* (2013.01); *A61H 2003/043* (2013.01); *A61H 2003/046* (2013.01); *A61H 2201/1215* (2013.01); *A61H 2201/1463* (2013.01); *A61H 2201/5058* (2013.01); *B60B 2200/47* (2013.01); *B60B 2900/325* (2013.01); *B60B 2900/3312* (2013.01); *B60B 2900/931* (2013.01); *F16D 2121/20* (2013.01)

(58) Field of Classification Search
CPC ................... A61H 2003/043–046; A61H 3/04
See application file for complete search history.

(56) References Cited

U.S. PATENT DOCUMENTS

| | | | |
|---|---|---|---|
| 7,592,733 B2 | 9/2009 | Naitou et al. | |
| 7,708,120 B2 | 5/2010 | Einbinder | |
| 8,807,251 B2* | 8/2014 | Pandya | B60L 7/24 301/6.5 |
| 10,568,789 B2 | 2/2020 | McColl et al. | |
| 11,648,170 B1* | 5/2023 | Abrahamson | F16C 1/18 280/47.34 |
| 2010/0193264 A1* | 8/2010 | Kurek | A61H 3/04 180/19.1 |

(Continued)

*Primary Examiner* — Erez Gurari

(74) *Attorney, Agent, or Firm* — Boyle Fredrickson, S.C.

(57) ABSTRACT

Systems and methods for an improved walker are provided. The inventive walker allows for greater control over the speed of the walker. More specifically, wheels having specific characteristics may be used to control the speed of rotation of the wheels. For instance, the wheel may include an inner wheel assembly including a coil or coils, and an outer wheel assembly including a magnet or magnets. A magnetic field may be created using current through the coils, which in turn limits the speed with which the outer wheel assembly can be rotated relative to the inner wheel assembly. The present invention also includes a control system used to control the speed and other characteristics of the walker. The present invention may also collect associated data and display of the same which can help determine future activities associated with the walker.

18 Claims, 5 Drawing Sheets

(56) References Cited

U.S. PATENT DOCUMENTS

| | | | |
|---|---|---|---|
| 2011/0298190 A1* | 12/2011 | Diaz | A61H 3/04 |
| | | | 280/87.021 |
| 2015/0359699 A1* | 12/2015 | Chang | A61H 3/04 |
| | | | 701/22 |
| 2017/0361649 A1* | 12/2017 | Lin | B60B 3/082 |
| 2020/0188201 A1 | 6/2020 | McColl et al. | |
| 2021/0283952 A1 | 9/2021 | Cooper et al. | |
| 2023/0029427 A1* | 1/2023 | Karlovich | A61N 1/36003 |
| 2024/0003393 A1* | 1/2024 | DiCicco | F16D 65/22 |
| 2024/0277552 A1* | 8/2024 | Li | B60T 13/748 |
| 2025/0009590 A1* | 1/2025 | Cha | A61H 3/04 |

\* cited by examiner

MAGNETIC BRAKING AND SPEED CONTROL SYSTEM FOR WALKER

CROSS-REFERENCE(S) TO RELATED APPLICATION(S)

This application claims the benefit of priority on U.S. Provisional Patent Application Ser. No. 63/357,748, filed on Jul. 1, 2022 and entitled Magnetic Braking and Speed Control System for Walker, the entirety of which is hereby incorporated by reference.

BACKGROUND OF THE INVENTION

1. Field of the Invention

The present invention relates in general to the field of walkers. More particularly, the present invention relates to walkers that are used by individuals who need assistance in mobility, such as due to injury, disease, or other factors that impair movement and balance while moving from one location to the next. Specifically, a preferred embodiment of the present invention relates to a walker that includes various mechanisms or features to alter the speed and cadence with which the individual moves using the walker.

2. Discussion of the Related Art

A variety of different mobility assistance devices have been used to improve the safety of individuals moving from one location to another. For instance, many individuals have issues with balance and mobility, particularly in light of injury, disease, and age. Individuals prone to issues with balance and mobility oftentimes utilize a variety of different equipment to improve stability and minimize risk of falls or other issues, which can result in further injury and discomfort. By way of example, individuals oftentimes utilize walkers that have a frame including vertical components that can be rested upon or rolled upon the ground while a user walks from one location to another. Similarly, crutches, canes, and the like can be used where a user engages the device with the ground, moves his or her legs, and then moves the device to a new location before engaging it again with the ground.

Traditional walkers typically have a frame including two or more legs, as well as horizontal structures that connect the legs to one another. Many traditional walkers have four legs. Traditional walkers sometimes include two or more wheels mounted to the legs that help to enable easy movement of the walker along a ground surface. In some instances, four wheels are included, with one being mounted to the bottom of each respective leg. In other instances, two wheels are included that are attached to the pair of front legs. In these embodiments, the pair of rear legs oftentimes have a padded or textured foot, which help to grip the ground surface once the feet abut the ground surface. The walker frame may be configured to accommodate some or all of the weight associated with the user. Additional features are routinely included with traditional walkers, including hand grips, adjustable legs, a disengageable wheel lock, an optional seat, and the like. Furthermore, many walkers are collapsible for ease of transportation.

While the traditional walkers described above provide significant advantages to a user, further improvements are desired. For instance, many walkers do not have features that allow the speed of the walker to be changed or controlled. This means that users might push the walker at speeds greater than what they are capable of walking. Oftentimes, when the walker is moving at a faster pace than a user is capable of walking, the walker can start to creep away from the user, causing the user to hunch forward, and in some instances, fall forward onto the user's knees, hands, face, or the like. One primitive way of tempering the speed of a walker is by installing tennis balls or rubber stoppers in the bottom of one or more of the legs. Although such configurations may be helpful, they do not deliver consistent results and speeds, particularly when using the walker on a variety of different surfaces which may or may not result in the desired amount of friction between the walker and the ground surface. Another primitive way of controlling speed is by utilizing a hand brake that is located adjacent to a handle. However, many hand brakes are difficult to control, particularly for individuals having reduced grip strength. Again, further improvements are desired to improve the control and variation of speed of a walker.

What is therefore needed is an improved walker, where the speed of the walker can be varied depending on the skills and capabilities of a user. What is further needed is an improved walker including various features or components located in or around the legs or wheels of the walker to control the speed of the walker, for instance by controlling the speed of rotation of the wheels of the walker. What is further needed is an improved walker utilizing various magnetic components within the wheels to slow the speed of rotation of the wheels. What is further needed is an improved walker system where an accessory component can be added to a preexisting walker to control the speed with which the walker is moved. What is also needed is a system capable of controlling the speed of the walker using a lower power battery.

SUMMARY OF THE INVENTION

By way of summary, the present invention is directed to a safety walker whose speed can be varied and controlled. More specifically, the safety walker includes a frame having at least two legs, at least one horizontal frame member connecting the at least two legs, a grip for a user's hands, as well as a wheel that is configured for varying speed control. The wheel may include an inner wheel assembly and an outer wheel assembly. The speed of rotation of the outer wheel assembly relative to the inner wheel assembly may be resisted. For instance, the inner wheel assembly may include a coil assembly and the outer wheel assembly may include an outer wheel and at least one magnet mounted within the outer wheel. Power may be supplied to the coil assembly in order to create a magnetic field, such as using wires extending through an axle of the wheel. When this occurs, movement of the magnet may be restricted, which in turn limits the speed of rotation of the outer wheel assembly relative to the inner wheel assembly. Additionally, a controller may be provided that controls the magnetic field in order to implement varying levels of resistance, which in turn changes the available speed of rotation of the outer wheel assembly relative to the inner wheel assembly. In an alternative embodiment, the coil assembly may be shorted in order to resist movement of the wheel. In such an embodiment, this can be achieved using a lower power battery. Furthermore, the safety walker may have various sensors that monitor and alert users of movement of the frame and the wheel.

According to another aspect of the present invention, a method is provided of operating a safety walker. The method includes the steps of pushing the safety walker along a surface and regulating the speed of rotation of wheels associated with the safety walker. More specifically, the method includes rotating an outer wheel assembly relative to an inner wheel assembly and restricting the speed of rotation of the outer wheel assembly relative to the inner wheel assembly. This may be achieved by supplying power to a coil found within the inner wheel assembly and creating a magnetic field about the coil. Further, the method may include installing the wheel to a preexisting walker. Also, the method may include the steps of monitoring one or more characteristics associated with the walker and the wheel including speed, distance traveled, and time traveled, as well as displaying such characteristics for instance on an application. Further still, a plurality of individuals may be permitted to monitor and alter operating characteristics of the walker and the wheel using the application. In an additional embodiment, the method may include the steps of setting a first speed of rotation, setting a predetermined distance at which the first speed of rotation is acceptable, setting a second speed of rotation, and reducing the speed of rotation to the second speed of rotation once the predetermined distance has been traveled.

According to another aspect of the present invention, a safety movement device is provided that includes a wheel having an axle, an inner wheel assembly, and an outer wheel assembly, and at least one wire extending through the axle. A magnetic field is then created by the wire to restrict rotation of the inner wheel assembly and the outer wheel assembly. Again, the inner wheel assembly may further include at least one coil with the wire supplying power to create a magnetic field about the at least one coil. Also, the outer wheel assembly further includes at least one magnet mounted to an inner surface, where the magnetic field resists movement of the at least one magnet to limit the speed of rotation of the outer wheel assembly. Additionally, the magnetic field may completely resist movement of the outer wheel assembly relative to the inner wheel assembly when the walker should not be used.

These, and other features and aspects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which.

Figure 1:
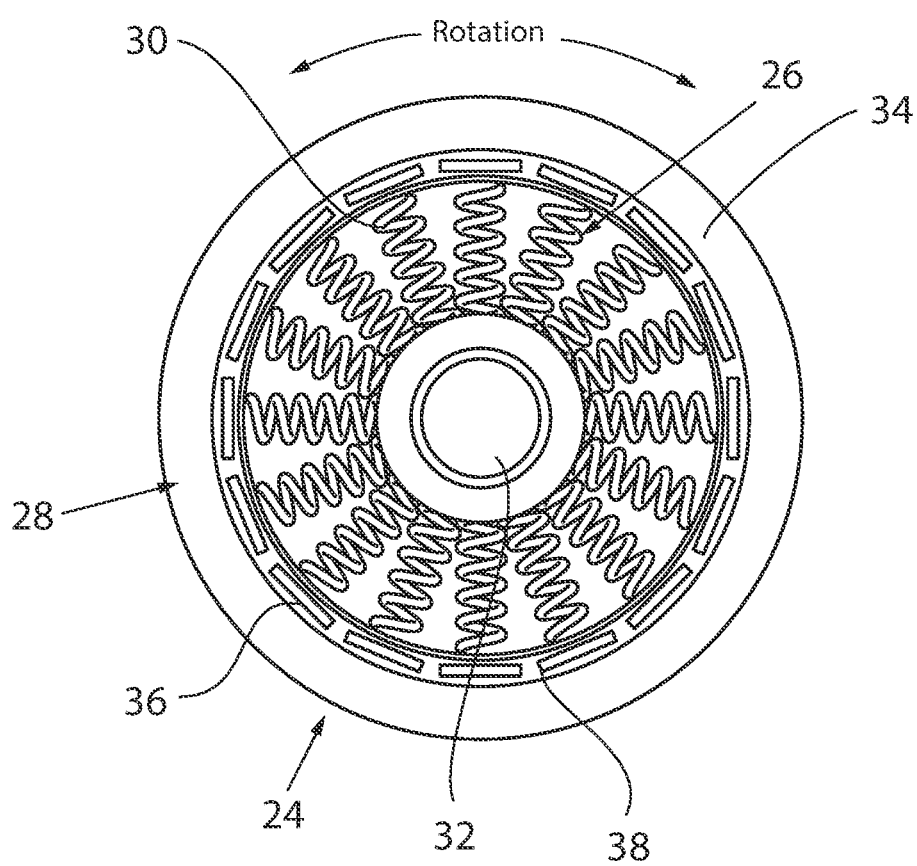
FIG. 1 is a side view of a wheel used with the inventive walker that enables control of the speed of rotation of the wheel.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. They are not limited to direct connection but include connection through other elements where such connection is recognized as being equivalent by those skilled in the art.

DESCRIPTION OF PREFERRED EMBODIMENTS

The present invention and the various features and advantageous details thereof are explained more fully with reference to the non-limiting embodiments described in detail in the following description.

1. System Overview

The present invention is directed to a safety device that assists patients having mobility and/or balance issues with walking from one location to another. More specifically, the present invention is a magnetic braking system for a walker that controls the walking pace of the patient. The magnetic braking system includes magnetic cores for use with or within wheels, wheel hubs, and/or wheel mounts. In addition to a wheel hub, a control module may be used to control aspects of the magnetic braking system.

The inventive braking system works by controlling a magnetic field by shorting out coil leads. In doing so, a large power source is not required and therefore can be eliminated in favor of a small power source. For instance, a nine-volt battery may be used to power such a system. The coils can be controlled using components such as integrated circuits, semiconductors, or relays. In other embodiments, no electricity is needed whatsoever while still allowing for the desired braking ability. This in turn makes the system lightweight and easy to implement with an existing or new walker while minimizing weight.

The present invention allows users to walk with confidence without the need to implement friction brakes, which rely upon friction or dragging along the ground to provide speed control, which can be unreliable and inconsistent. Further still, use of friction typically requires components to be routinely replaced.

The present invention also may include various sensors mounted about the walker to help identify potentially dangerous behavior and alert the user and/or others to prevent inadvertent injuries. For instance, LED and piezoelectricity can be used as an alert system.

2. Detailed Description

Figure 4:
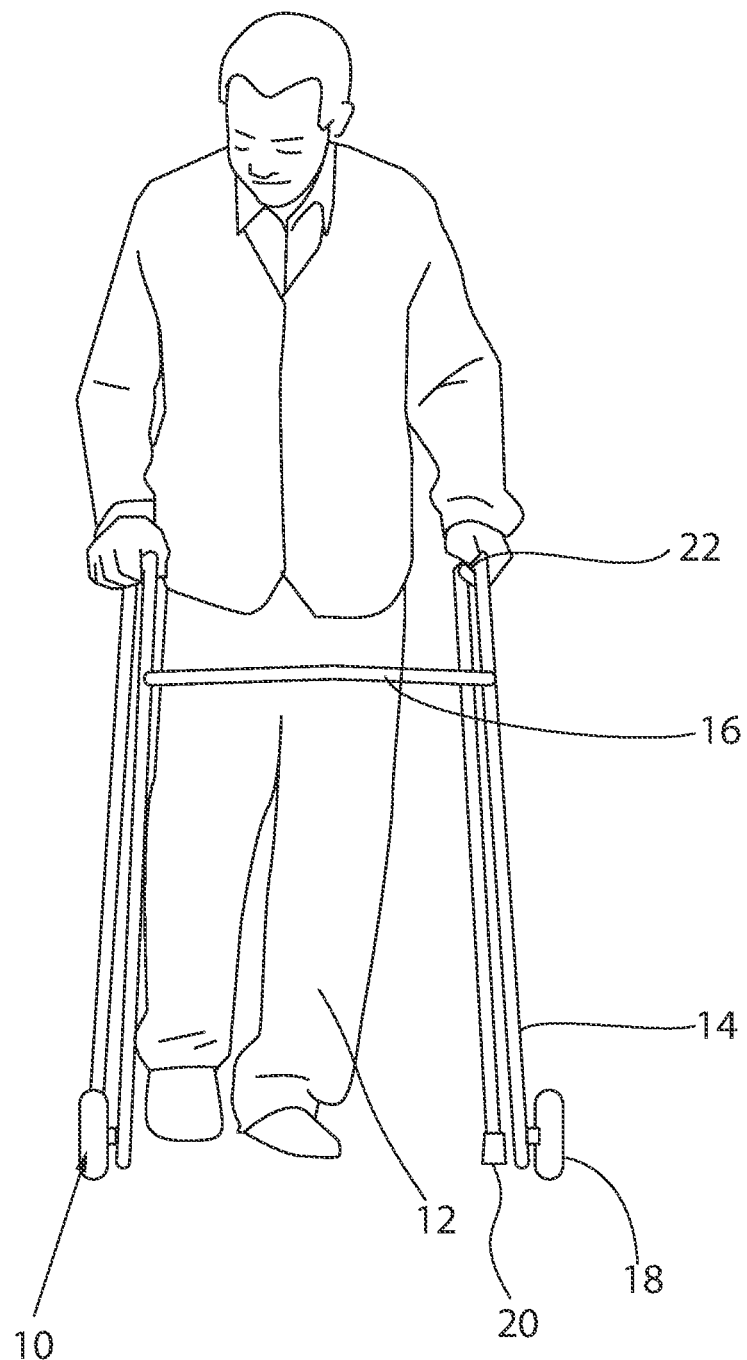
FIG. 4 is a perspective view of a traditional walker of the prior art, where the inventive wheel shown in FIGS. 1-3 can be installed.
Figure 5:
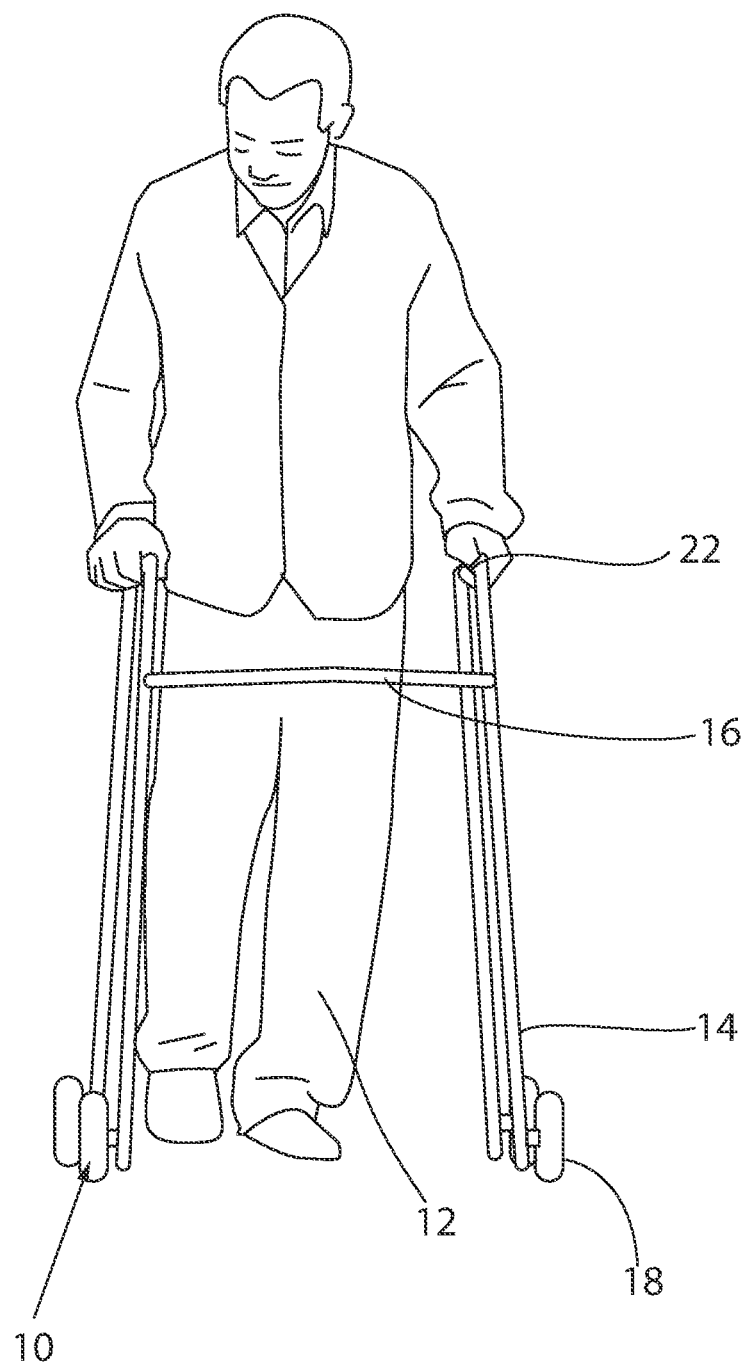
FIG. 5 is a perspective view of another traditional walker of the prior art, where the inventive wheel shown in FIGS. 1-3 can be installed.

Turning to the figures, the present invention is directed to an improved walker 10 that has various features to improve the safety and quality use of the walker 10 by individuals 12 using the walker 10 to move from a first location to a second location. Turning briefly to FIGS. 4 and 5, an existing walker 10 is shown. The present invention may be integrated and used with a preexisting walker 10 like the one shown in FIGS. 4 and 5, which is beneficial for those individuals who already own a walker 10, or who would like to purchase or acquire one secondhand for cost savings. With that said, the present invention could similarly involve an entirely new inventive walker 10.

Initially, common features of the walker 10 will be described. The walker 10 includes a frame with a plurality of legs 14, as shown, four legs, with two front legs and two rear legs. Additionally, the walker 10 includes at least one horizontal frame component 16 configured to connect the left and right side of the walker 10 together. As shown, the legs 14 are adjustable to accommodate the height of any number of different users. The walker 10 also includes wheels 18 at the bottom of the front legs 14 and feet 20 at the bottom of the rear legs 14 as shown in FIG. 4. In another embodiment, the walker 10 may include four wheels 18, with one associated with each of the legs. The walker 10 additionally includes hand grips 22 located toward the top of the frame of the walker 10 that a user can grip while he or she uses the walker 10.

Figure 2:
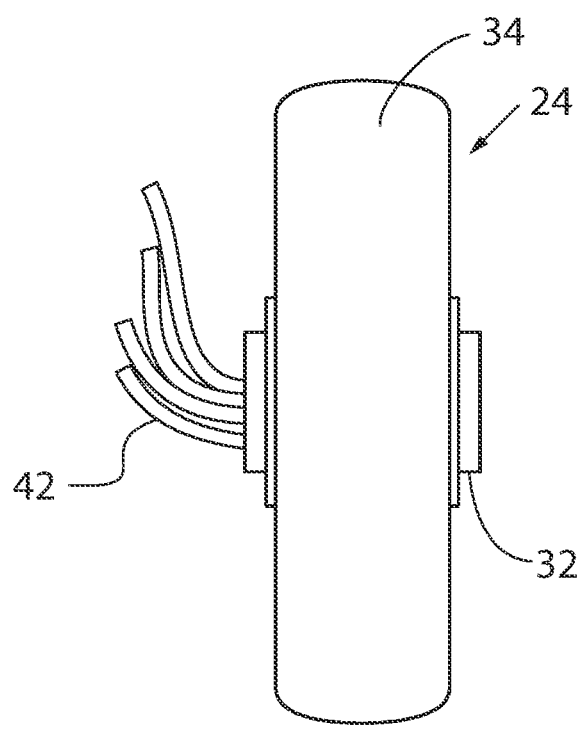
FIG. 2 is a front view of the wheel of FIG. 1 with wires extending from an axle of the wheel.
Figure 3:
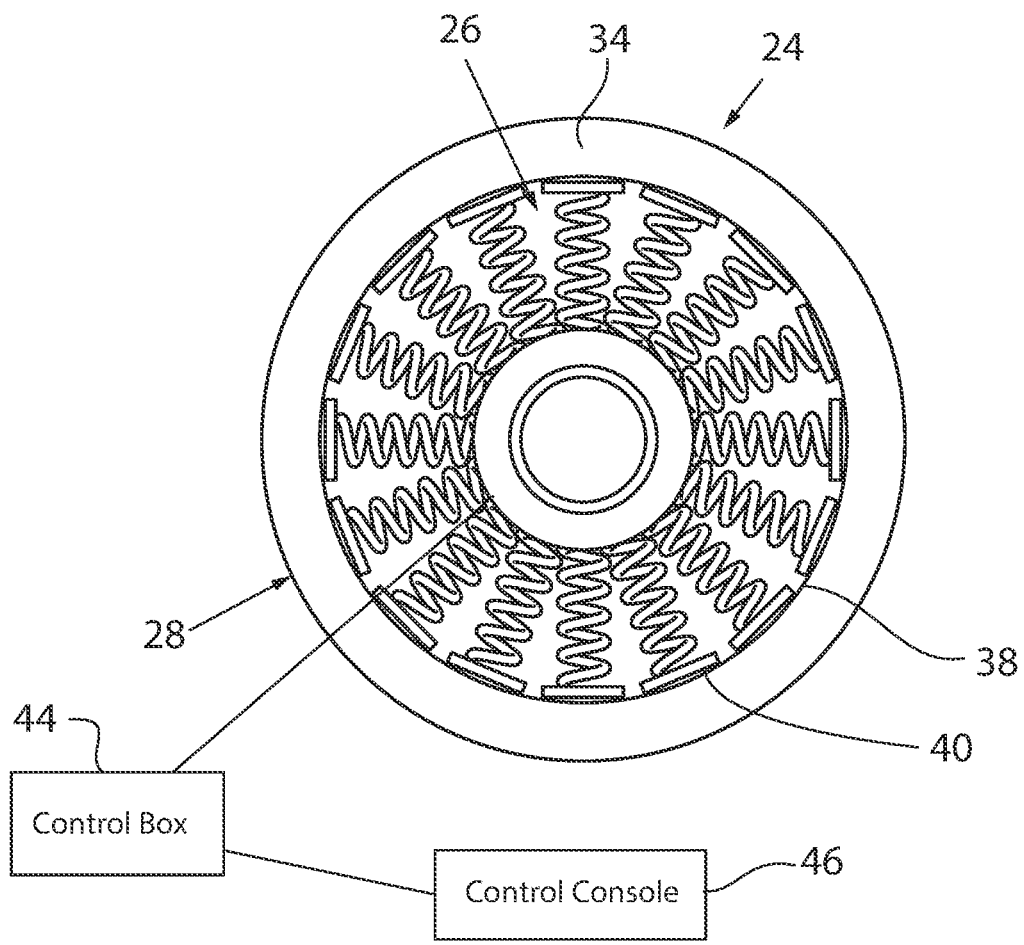
FIG. 3 is a side view of another wheel used with the inventive walker.

Turning to FIGS. 1-3, an innovative wheel 24 is shown that helps enable control of a user's speed while he or she uses the walker 10. As mentioned above, the innovative wheel 24 can be retrofit onto an existing walker 10, otherwise it can be installed on a new walker 10. While a single wheel 24 is illustrated, it is understood that the present invention may be used with multiple wheels of a walker 10, such as two or four wheels associated with two or four legs 14.

More specifically, the innovative wheel 24 includes various components that limit the speed of rotation of the wheel 24. As shown, the wheel 24 of the present invention include an inner wheel assembly 26 and an outer wheel assembly 28. The inner wheel assembly 26 includes a plurality of coils 30 that extend outwardly from an axle 32. The plurality of coils 30 may have a variety of different configurations depending on the desired resulting characteristics, including for instance different gauges of wire for the associated coil, different number of windings, etc.

The outer wheel assembly 28 includes an outer wheel/tire 34, with a plurality of magnets 36 mounted to an interior surface 38 of the outer wheel/tire 34. For instance, small magnetic plates 40 may be mounted to the interior surface 38 of the outer wheel/tire 34. A magnetic field can be initiated, which in turn causes a magnetic force to resist rotation of the wheel 24. For instance, wires 42 may be provided to the axle 32 of the wheel 24 that provide the necessary power to initiate the magnetic field. Further, in the illustrated embodiment, the inner wheel assembly 26 including the axle 32 is stationary, whereas the outer wheel assembly 28 is rotatable. As such, when the magnetic field is initiated, rotation of the outer wheel assembly 28 is reduced or slowed based on the magnetic pull between the coil assembly 30 of the inner wheel assembly 26 and the magnets 36 mounted to the outer wheel assembly 28. In fact, rotation of the outer wheel assembly 28 can be completely prevented when movement of the walker 10 is disabled such that the force of the magnetic field is of sufficient power to prevent further rotation. Similarly, rotation of the wheel 24 may only be permitted in one direction, such as in the forward direction, whereas rotation of the wheel 24 in the opposite direction, such as the rear direction, can be prevented. Further still, the wheels 24 may be used to control directional axis movement to control vector control, such as movement to the left or right. Rotation of the wheel 24 may be restricted or prevented by shorting out the coils. For instance, wires of a stepping motor may be shorted in order to achieve the desired rotational effect without the need for a bulky, heavy battery. Rather, such a system is operated using a small, lightweight battery, such as a nine-volt battery. This allows a desired pace or cadence to be achieved based on how freely the wheel is able to be turned.

Of course, the present invention is not limited to the exact embodiment shown in the figures. Rather, many other embodiments having similar operation and/or results would fall within the scope of the present invention. By way of example and not limitation, the magnets and/or coil assembly could be mounted elsewhere. For instance, one or more of these components could be located at the axle itself. Similarly, a coil assembly could be found within the outer wheel assembly, with the magnets located at the inner wheel assembly. Further still, magnets and coils could be substituted for any other components that prevent/reduce the rotation of one component relative to another.

In addition to the physical components themselves as described above, the present invention is also directed to associated controls. For instance, the wheel 24 of the present invention can be physically connected to a control system that is mounted to the walker 10. For instance, the control system may include a control box 44 and/or a control console 46. The control box 44 and console 46 may both be mounted directedly to the walker 10 itself, otherwise, one or both may be located separate from the walker to allow for remote monitoring and control. For instance, the present invention could be controlled wirelessly using an application loaded onto a computer, a smart phone, a tablet, and the like. Regardless of where the invention is controlled, the controls allow a user to manipulate a number of conditions. Primarily, the speed of rotation of the wheels 34 can be manipulated, and completely prevented if desired. Other related conditions can be monitored and manipulated, for instance, the amount of time or distance a wheel 34 can be rotated before the speed is reduced or completely prevented. This would enable users to allow a set speed for a period of time or distance, after which the speed of rotation can be reduced or cut off to avoid injury or other issues associated with fatigue of the user.

Further still, the invention and associated conditions may be varied by the individual actually using the walker, as well as other third parties such as family members, friends, nurses, doctors, and other employees at a given hospital or other facility. In fact, multiple individuals may be able to control the operating characteristics, with a hierarchy being assigned in which certain individuals can override the operating characteristics. This may be especially appealing for individuals having cognitive or other issues that may impact the user's ability to assess the safety associated with a given speed or distance, in which case a supervisor may override the user's preferred speed.

Additionally, the application may be used to track and display user characteristics, such as current speed, average speed, distance traveled, time traveled, etc. All of these statistics may be monitored and displayed to enable a user or users to better appreciate use of the inventive walker 10. This may help with preventative care and planning to identify current issues, and avoid potential future issues. Further still, other characteristics could similarly be monitored and displayed, including use of other speed controlling characteristics such as hand grips and associated sensors. The application may also be configured to alert users of undesirable conditions, such as excessive speed and the like.

There are virtually innumerable uses for the present invention, all of which need not be detailed here. All the disclosed embodiments can be practiced without undue experimentation.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

In addition, the individual components need not be fabricated from the disclosed materials, but could be fabricated from virtually any suitable materials.

Moreover, the individual components need not be formed in the disclosed shapes, or assembled in the disclosed configuration, but could be provided in virtually any shape, and assembled in virtually any configuration. Further, although some of the described components may be physically separate modules, it will be manifest that the various components may be integrated into other apparatus with which it is associated. Furthermore, all the disclosed features of each disclosed embodiment can be combined with, or substituted for, the disclosed features of every other disclosed embodiment except where such features are mutually exclusive.

It is intended that the appended claims cover all such additions, modifications and rearrangements. Expedient embodiments of the present invention are differentiated by the appended claims.

What is claimed is:

1. A safety walker comprising:
a frame comprising:
at least two legs;
at least one horizontal frame member connecting the at least two legs; and
a grip for a user's hands; and
a wheel configured for varying speed control and further comprising
an inner wheel assembly; and
an outer wheel assembly:
wherein a speed of rotation of the outer wheel assembly relative to the inner wheel assembly is resisted.

2. The safety walker of claim 1, wherein the inner wheel assembly further comprises a coil assembly; and
wherein the outer wheel assembly further comprises:
an outer wheel; and
at least one magnet mounted within the outer wheel.

3. The safety walker of claim 2, wherein a magnetic field is created by the coil assembly to resist movement of the magnets as the outer wheel assembly rotates relative to the inner wheel assembly.

4. The safety walker of claim 3, further comprising at least one wire extending through an axle of the wheel to supply power to the coil to create the magnetic field.

5. The safety walker of claim 4, further comprising a controller configured to control the magnetic field to vary the level of resistance to reduce the speed of rotation of the outer wheel assembly relative to the inner wheel assembly.

6. The safety walker of claim 1, further comprising a plurality of sensors to monitor movement of the frame and the wheel.

7. A method of operating a safety walker comprising the steps of:
pushing the safety walker along a surface; and
regulating the speed of rotation of wheels associated with the safety walker;
rotating an outer wheel assembly relative to an inner wheel assembly; and
restricting the speed of rotation of the outer wheel assembly relative to the inner wheel assembly.

8. The method of claim 7, further comprising the steps of:
supplying power to a coil found within the inner wheel assembly; and
creating a magnetic field about the coil.

9. The method of claim 8, further comprising the step of restricting the speed of rotation of at least one magnet mounted to the outer wheel assembly by the magnetic field.

10. The method of claim 7, further comprising the step of shorting a plurality of wires to regulate the speed of the rotation.

11. The method of claim 7, further comprising the step of monitoring one or more characteristics associated with the walker and the wheel including speed, distance traveled, and length of time traveled.

12. The method of claim 11, further comprising the step of displaying the one or more characteristics on an application.

13. The method of claim 12, further comprising the step of allowing a plurality of individuals to monitor and alter operating characteristics of the walker and the wheel using the application.

14. The method of claim 7, further comprising the steps of:
setting a first speed of rotation;
setting a predetermined distance at which the first speed of rotation is acceptable;
setting a second speed of rotation; and
reducing the speed of rotation to the second speed of rotation once the predetermined distance has been traveled;
wherein the first speed of rotations is greater than the second speed of rotation.

15. A safety movement device for controlled movement by a user comprising:
a wheel comprising:
an axle;
an inner wheel assembly; and
an outer wheel assembly; and
at least one wire extending through the axle;
wherein a magnetic field is created by the wire to restrict rotation of the inner wheel assembly and the outer wheel assembly.

16. The safety movement device of claim 15, wherein the inner wheel assembly further comprises at least one coil;
wherein the wire supplies power to create a magnetic field about the at least one coil.

17. The safety movement device of claim 16, wherein the outer wheel assembly further comprises at least one magnet mounted to an inner surface;
wherein the magnetic field resists movement of the at least one magnet to limit the speed of rotation of the outer wheel assembly.

18. The safety movement device of claim 17, wherein the magnetic field completely resists movement of the outer wheel assembly relative to the inner wheel assembly.

* * * * *